(12) United States Patent
Zoeckler et al.

(10) Patent No.: US 8,160,581 B2
(45) Date of Patent: Apr. 17, 2012

(54) SYSTEM AND METHOD FOR CORRECTING A MOBILE IDENTIFICATION NUMBER

(75) Inventors: Dennis L. Zoeckler, Brighton, MI (US); Shawn F. Granda, Novi, MI (US)

(73) Assignee: General Motors LLC, Detroit, MI (US)

( * ) Notice: Subject to any disclaimer, the term of this patent is extended or adjusted under 35 U.S.C. 154(b) by 434 days.

(21) Appl. No.: 12/360,536

(22) Filed: Jan. 27, 2009

(65) Prior Publication Data
US 2010/0190493 A1    Jul. 29, 2010

(51) Int. Cl.
*H04W 4/00* (2009.01)
*H04M 1/24* (2006.01)
*H04M 3/08* (2006.01)
*H04M 3/22* (2006.01)
*H04M 3/42* (2006.01)
*H04M 7/00* (2006.01)

(52) U.S. Cl. .......... 455/433; 455/435.1; 455/435.2; 455/435.3; 455/551; 379/15.03; 379/15.05; 379/201.12; 379/204.01; 379/221.14

(58) Field of Classification Search .............. None
See application file for complete search history.

(56) References Cited

U.S. PATENT DOCUMENTS

| | | | |
|---|---|---|---|
| 7,035,631 B2 * | 4/2006 | Schwinke et al. | 455/420 |
| 7,190,969 B1 * | 3/2007 | Oh et al. | 455/551 |
| 7,305,090 B1 * | 12/2007 | Hayes et al. | 380/249 |
| 7,437,183 B2 * | 10/2008 | Makinen | 455/569.1 |
| 7,647,041 B2 * | 1/2010 | Gonsalves et al. | 455/420 |
| 2006/0217109 A1 * | 9/2006 | Sobb et al. | 455/414.1 |
| 2008/0228637 A1 * | 9/2008 | Scipioni et al. | 705/39 |

* cited by examiner

*Primary Examiner* — Patrick Edouard
*Assistant Examiner* — Scott Schlack
(74) *Attorney, Agent, or Firm* — Leydig, Voit & Mayer, Ltd.

(57) ABSTRACT

A system for correcting or updating a mobile identification number in a cellular telephone portion of a telematics unit installed in a vehicle allows service providers to resolve duplicate entries. A wireless service provider stores a triplicate entry in their HLR for cellular telephones associated with a number of telematics unit. The triplicate entry includes a MDN, a MIN, and an ESN. If a telematics unit's triplicate entry is an invalid combination, resulting, e.g., in call failure, the system provides an efficient mechanism whereby the service provider can update the MIN of each cellular telephone in one or more telematics units to eliminate duplicate entries.

19 Claims, 24 Drawing Sheets

Step 6: The Telematics Service Provider is Notified by Carrier of Successful Activation by Carrier for VEH 1 and 2. Telematics Service Provider Attempts to Connect to Both Vehicles

Correction Steps:

Step 1: Selects the "Active" Triplicate Stored by Carrier in HLR

Step 2: Carrier Assigns New MIN to VEH 1 for Telematics Service Provider Update to Vehicle – Carrier Does Not Update HLR with New MIN

Step 4: The Telematics Service Provider Notifies Carrier of Successful MIN Change. Carrier Activates New MIN to VEH 1

Step 8: Carrier Activates VEH 4 with MIN 4

Correction Steps (cont.): Multiple (3+) VIN's to Same MIN

Step 11: Carrier Activates VEH 1 with MIN 2

VEH 1 — 1902 | MDN 1 — 1904 | MIN 2 — 1906 | ESN 1 — 1908 | HLR = Y — 1910

Step 14: Carrier Activates VEH 3 with MIN 3

SYSTEM AND METHOD FOR CORRECTING A MOBILE IDENTIFICATION NUMBER

FIELD OF THE INVENTION

The present invention relates generally to correcting a mobile identification number in a cellular telephone, and in particular to a method and system for correcting a mobile identification number in a cellular telephone of a telematics unit installed in a vehicle.

BACKGROUND OF THE INVENTION

The communications facilities of telematics units traditionally rely on a "triplicate entry" of data to facilitate wireless communications to and from the device. The triplicate entry includes a Mobile Directory Number (MDN), a Mobile Identification Number (MIN), and an Electronic Serial Number (ESN). To function properly, each triplicate entry must be unique relative to other cellular telephones or devices supported by the wireless service provider in its system and network. An error in the triplicate entry will typically result in call failure, wherein the telematics unit cannot originate or receive cellular communications.

Traditionally, correction of erroneous triplicate entries requires the efforts and cooperation of both the telematics service provider and subscriber. However, this process is often complicated by the subscriber's refusal or inability to respond to requests for assistance in correcting the erroneous triplicate entry. This problem increases the provider's operating costs and decreases subscriber satisfaction. Moreover, even when the subscriber cooperates to resolve the issue, there is no guarantee that human errors will not occur in this process as well. The present invention is directed to the efficient and scalable correction of erroneous triplicate entries without the problems associated with prior correction mechanisms.

BRIEF SUMMARY OF THE INVENTION

Aspects of the invention include a method and system for correcting a mobile identification number in a cellular telephone of a telematics unit installed in a vehicle. A wireless service provider stores a triplicate entry in their Home Location Registry (HLR) for each cellular telephone within a telematics unit. The triplicate entry includes a Mobile Directory Number (MDN), a Mobile Identification Number (MIN), and an Electronic Serial Number (ESN) for the cellular telephone. Each triplicate entry must be unique with respect to the other triplicate entries in the HLR for the other cellular telephones supported by the wireless service provider in its system and network. If a triplicate entry for a telematics unit is stored as an invalid combination (e.g., the MIN is not unique with respect to the MINs of the other cellular telephones supported by the wireless service provider), call failure occurs, resulting in the telematics unit's inability to deliver or receive cellular telephone calls or other data.

However, if the MIN is invalid, but the MDN and the ESN are stored properly by the wireless service provider, a call can be placed to the subscriber vehicle MDN. A call cannot be received by the telematics unit until the triplicate entry of the telematics unit's cellular telephone matches the cellular provider's triplicate entry in its HLR for the cellular telephone. Aspects of the invention allow a telematics service provider and/or a wireless service provider to correct the MIN of the telematics unit's cellular telephone so that the telematics unit can perform successful call delivery. This includes the telematics service provider exchanging unique information stored in the telematics units with deficient triplicate entries with the wireless service provider. Thereafter, the wireless service provider activates a cellular telephone with a stored triplicate entry that is equivalent to the triplicate entry stored in the cellular telephone of the telematics unit. Subsequently, the telematics service provider can successfully connect to the telematics unit and correct the erroneous triplicate entry.

Traditionally, a telematics service subscriber would need to be involved to correct the triplicate entry of the telematics units' cellular telephone. Many times a telematics subscriber would not respond to requests by the telematics service provider to assist in correcting the triplicate entry. The present aspects of the invention remove the hurdle of a non-responsive telematics subscriber in correcting the triplicate entry improving customer satisfaction. Further aspects of the invention eliminate the need for a live advisor or customer service representative to be involved in correcting the triplicate entry. This provides increased efficiency and lowers operating costs for the telematics service provider.

In addition, an exemplary method and system are disclosed for ensuring that both the telematics and wireless service provider share the same triplicate entry for each cellular telephone in a telematics unit operating in the wireless service provider's network. This reduces network call failures and improves customer satisfaction.

The disclosed mechanism is beneficially scalable. For example, in an exemplary system, the disclosed mechanism may correct the triplicate entries of more than one thousand telematics units within a month.

DETAILED DESCRIPTION OF THE INVENTION

Before describing the invention in detail, an exemplary environment in which the invention may operate will be described. It will be appreciated that the disclosed environment is described for purposes of illustration only, and the provision of this description does not imply any limitation regarding the use of other environments to implement the invention.

Figure 1:
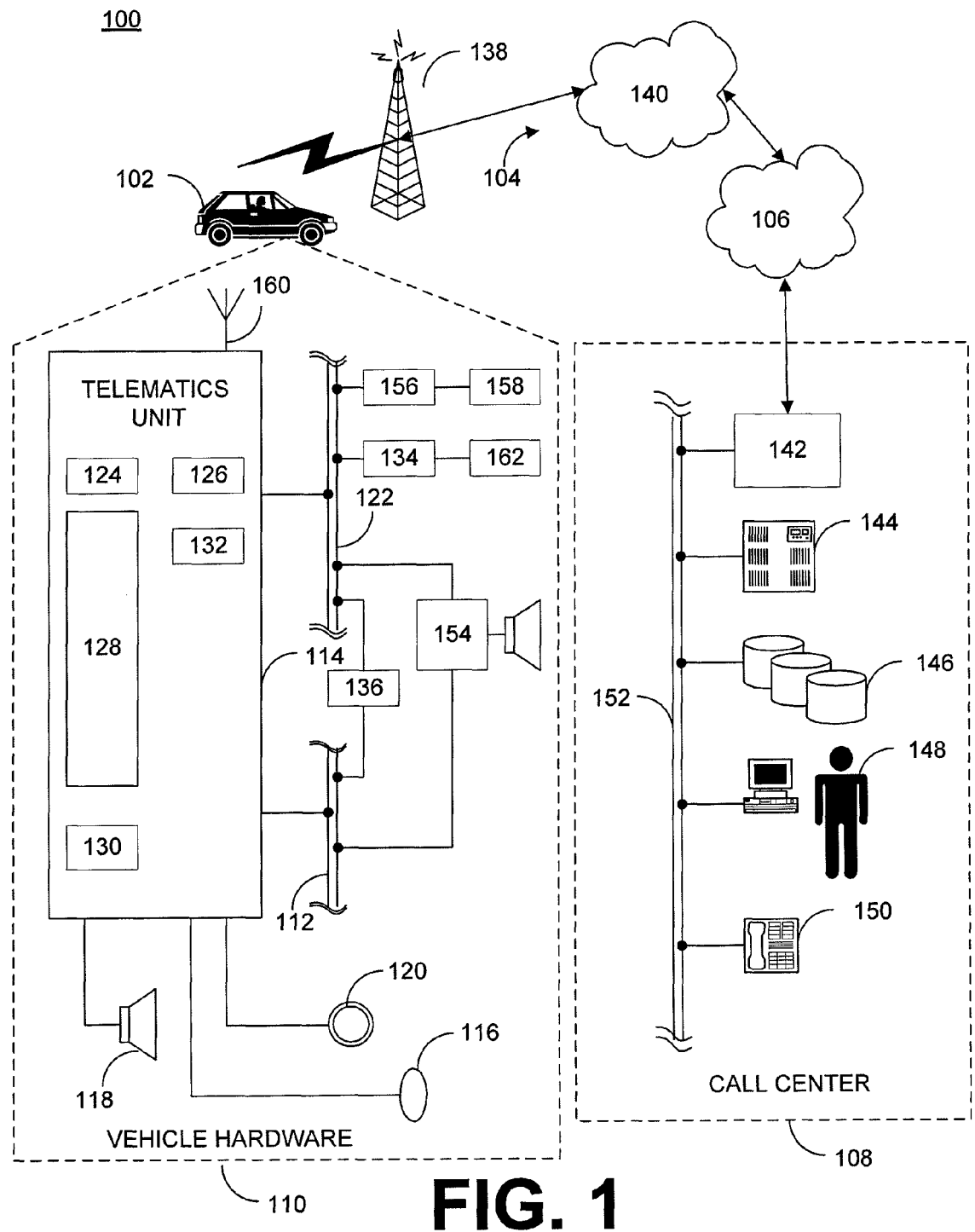
FIG. 1 is a schematic view of an exemplary communication system within which examples of the disclosed system may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128, one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various accident and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle accident and/or collision detection sensor interface 156 are operatively connected to the vehicle bus 122. The accident sensors 158 provide information to the telematics unit via the accident and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers, or various base stations could be coupled with a single MSC, to mention but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local area networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As noted above, in order for wireless communication to be accurately made and received with this and other similar environments, the triplicate entry associated with each telematics unit must be accurate. In reality, errors in such entries are common place, and must be corrected. In an aspect of the invention, a method and system are provided for correcting a mobile identification number in the cellular telephone of a telematics unit installed in a vehicle.

A wireless service provider stores a triplicate entry in their Home Location Registry (HLR) for each cellular telephone within each telematics unit that is supported by their system and network. The triplicate entry includes a Mobile Directory Number (MDN), a Mobile Identification Number (MIN), and an Electronic Serial Number (ESN) for each cellular telephone. Each triplicate entry must be unique with respect to the other triplicate entries in the HLR for the other cellular telephones supported by the wireless service provider in its system and network. If a telematics unit's triplicate entry is stored as an invalid combination (e.g., MIN is not unique with respect to the MINs of the other cellular telephones supported by the wireless service provider), call failure occurs resulting in the telematics unit's inability to originate or receive cellular communications.

However, even if the MIN is invalid, if the MDN and the ESN are stored properly by the wireless service provider, a call can be placed to the subscriber vehicle MDN. Nonetheless, a call cannot be received by the telematics unit until the triplicate entry of the telematics unit's cellular telephone matches the wireless service provider's HLR entry for the cellular telephone. Aspects of the invention allow a telematics service provider and/or a wireless service provider to correct the MIN of the telematics unit's cellular telephone so that the telematics unit can perform successful call delivery. In overview, the correction mechanism requires the telematics service provider to exchange unique information stored in the affected telematics unit with deficient triplicate entries with the wireless service provider. Thereafter, the wireless service provider activates a stored triplicate entry that is equivalent to the triplicate entry stored in the cellular telephone of the telematics units. Subsequently, the telematics service provider can successfully connect to the telematics unit and correct the triplicate entry.

Figure 2:
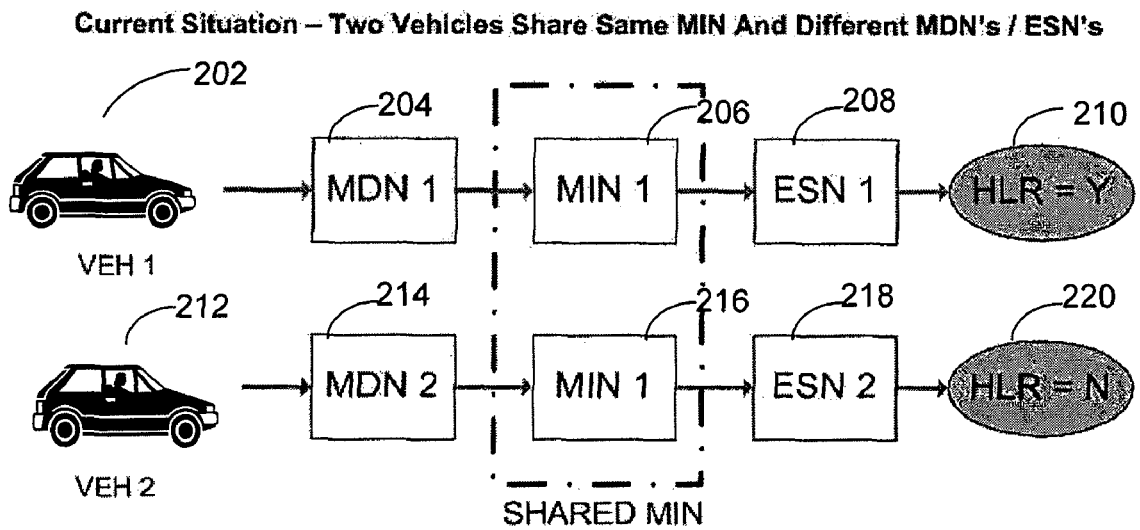
FIGS. 2-8 show exemplary steps in a method to correct a mobile identification number that is stored in one or more telematics units, according to an aspect of the invention.

FIGS. 2-8 show exemplary steps in an exemplary method to correct a mobile identification number that is stored in one or more telematics units, according to an aspect of the invention. In particular, FIG. 2 shows two telematics equipped vehicles (202, 212) each sharing the same MIN (206, 216), in their respective cellular telephones of their telematics units. Vehicle 1 (202) has a triplicate entry of (MDN 1, MIN 1, ESN 1) (204, 206, and 208 respectively) stored in its telematics unit. The wireless service provider's HLR has stored this triplicate entry for the telematics unit in vehicle 1 (210). Thus, this telematics unit is considered active.

Vehicle 2 (212) has a triplicate entry of (MDN 2, MIN 1, ESN 2) (214, 216, and 218 respectively) stored in its telematics unit. The wireless service provider's HLR has not stored this triplicate entry for the telematics unit in vehicle 2 (220). Thus, unlike the telematics unit of vehicle 1 (210), this telematics unit is not active. The exemplary steps shown in FIGS. 3-8 correct, change, or update the MIN for each vehicle's telematics unit so that both telematics units can successfully deliver and receive calls.

Figure 3:
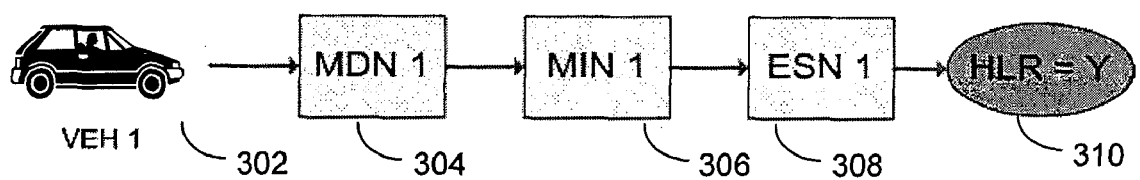
Figure 4:
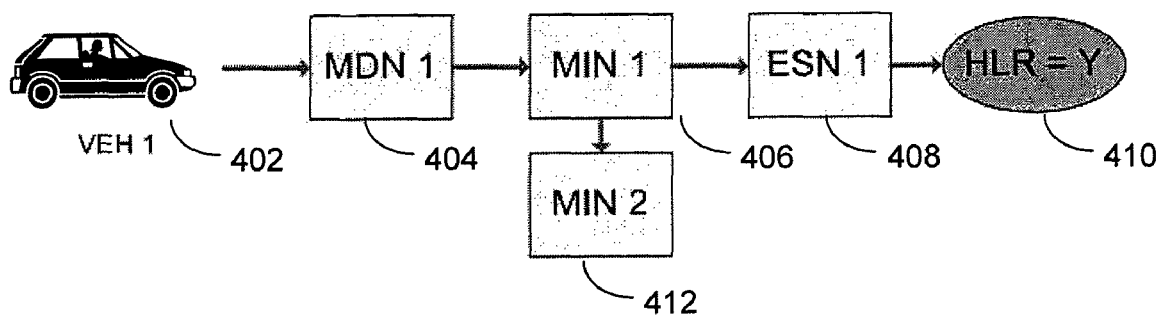
Figure 5:
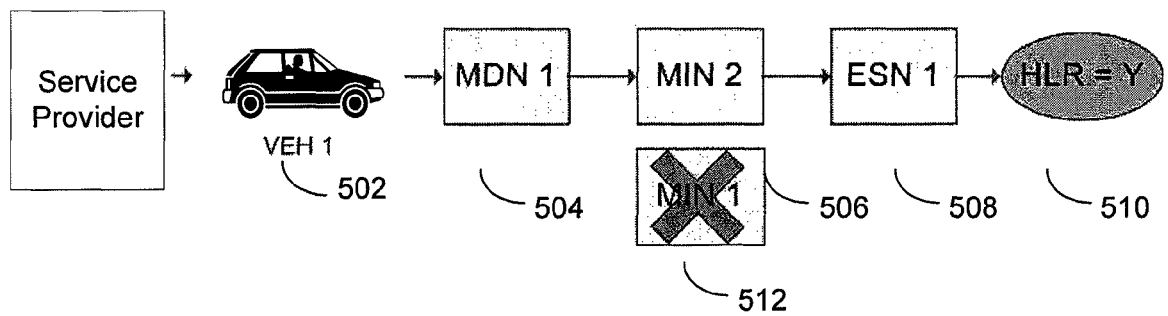

At a step shown graphically in FIG. 3, the wireless service provider selects the active triplicate entry (MDN 1, MIN 1, ESN 1) (304, 306, 308) for vehicle 1 (302) stored in its HLR 310. At the subsequent step shown in FIG. 4, the wireless service provider assigns a new MIN (MIN 2) 412 to the telematics unit in vehicle 1 (402). The wireless service provider does not, at this step, update the HLR 410 with the new triplicate entry (MDN 1, MIN 2, ESN 1) (404, 412, 408) that includes a new MIN. At a step shown in FIG. 5, the telematics service provider calls vehicle 1 (502) using the current triplicate entry (MDN 1, MIN 1, ESN 1) (504, 512, 508) and updates the MIN with the new MIN (MIN 2) 506.

Figure 6:
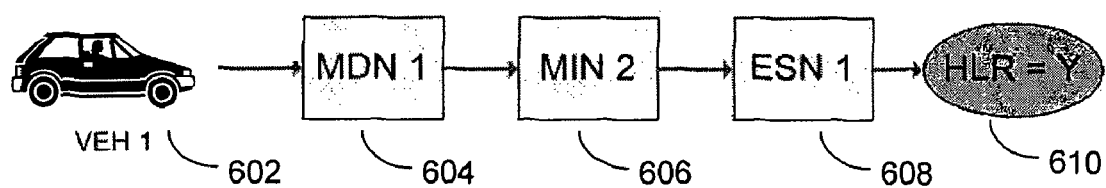
Figure 7:
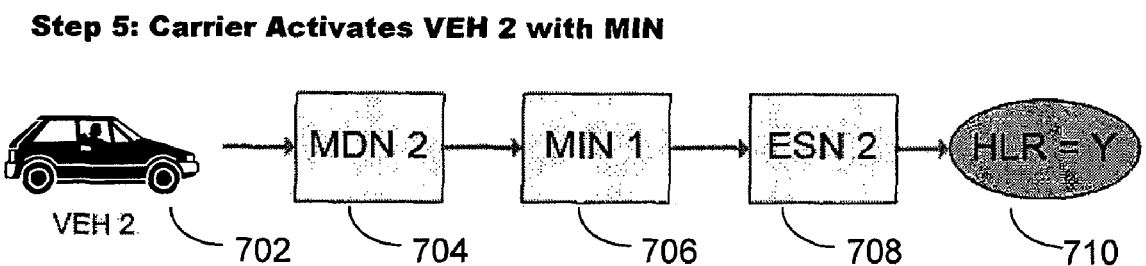
Figure 8:
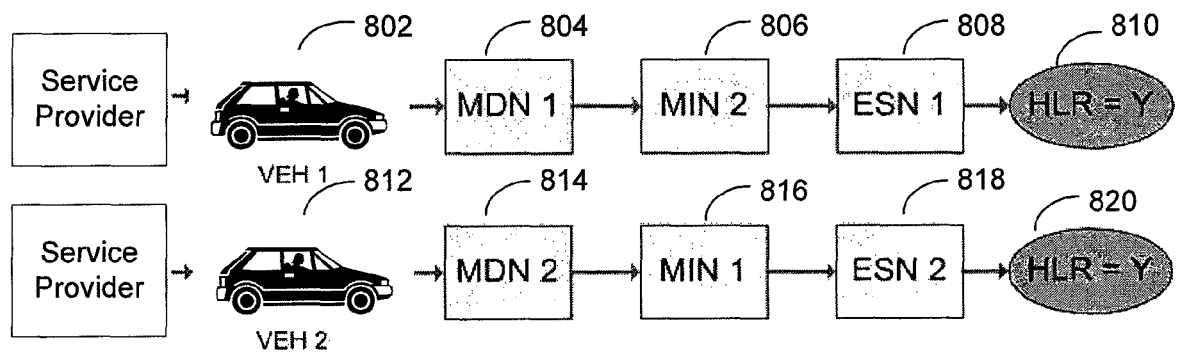

At the next step shown in FIG. 6, the telematics service provider notifies the wireless service provider of a successful MIN change in vehicle 1 (602). The wireless service provider activates the new MIN (MIN 2) 606 relative to vehicle 1 (602). This action may be done by storing the triplicate entry of (MDN 1, MIN 2, ESN 1) (604, 606, 608) for the telematics unit of vehicle 1 (602) in the HLR 610. At a subsequent step shown in FIG. 7, the wireless service provider activates MIN 1 (706) in the telematics unit installed in vehicle 2 (702). This may be done by storing the triplicate entry of (MDN 2, MIN 1, ESN 2) (704, 706, 708) for the telematics unit of vehicle 2 (702) in the HLR (710). As shown in FIG. 8, the wireless service provider then notifies the telematics service provider that it has successfully activated the telematics units for vehicle 1 and vehicle 2 (802, 812). The telematics service provider then attempts to connect to the telematics units in both vehicles using their respective triplicate entries, (MDN 1, MIN 2, ESN 1) (804, 806, 808) and (MDN 2, MIN 1, ESN 2) (814, 816, 818) stored in the wireless service provider's HLR (810, 820).

The exemplary method shown in FIGS. 2-8 may be summarized as follows. Vehicle 1 is stored as "active" by the carrier. Vehicle 2 is stored as "inactive" by the carrier. MIN 2 is assigned to Vehicle 1 by the carrier but is not updated in the HLR until after successful entry by the telematics service provider to Vehicle 1. If the telematics service provider is unable to connect to Vehicle 1 and Vehicle 2, carrier activates based on prioritization methodology described later in the description. The telematics service provider performs a test call both Vehicle 1 and Vehicle 2 after carrier activation to ensure triplicate combinations are active.

Figure 9:
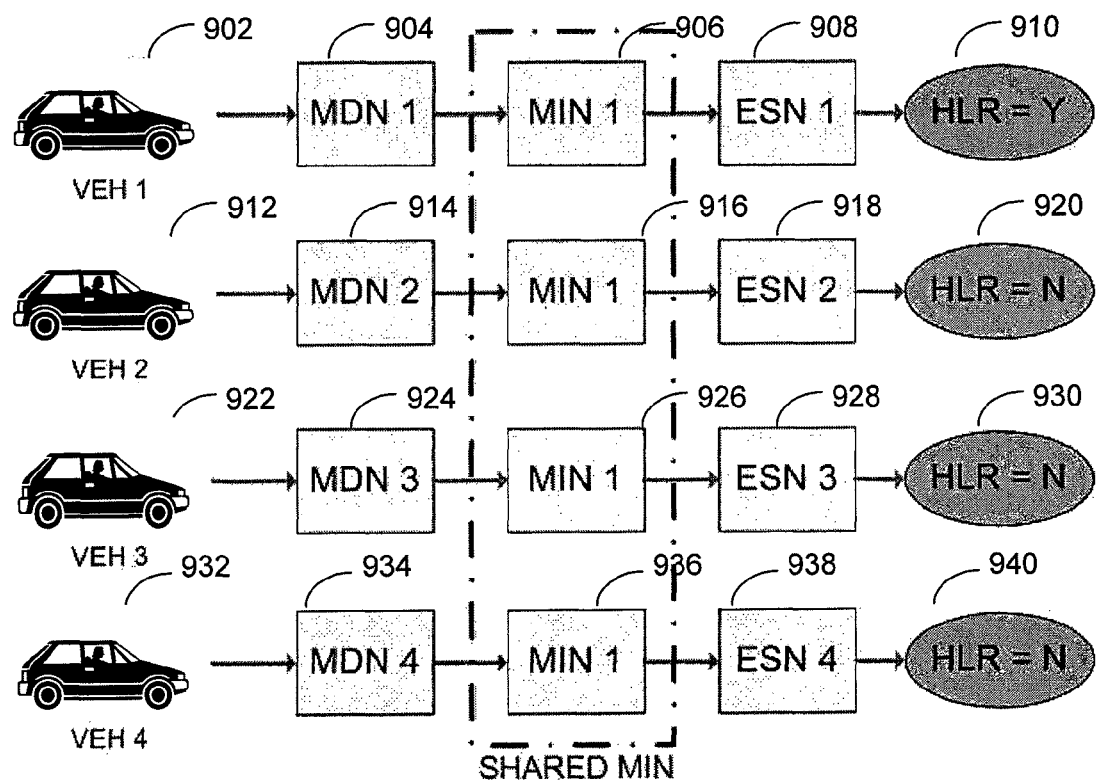
FIGS. 9-24 show exemplary steps in another exemplary method to correct a mobile identification number that is stored in three or more telematics units, according to a further aspect of the invention.

FIGS. 9-24 show exemplary steps in another method to correct the mobile identification number that is stored in three or more telematics units, according to an aspect of the invention. The exemplary method shown in FIGS. 9-24 corrects the MIN assignment for three or more vehicles sharing the same MIN. At the first step, shown in FIG. 9, the telematics service provider isolates multiple vehicles (i.e., telematics units) (902, 912, 922, 932) sharing the same MIN (906, 916, 926, 936), but each having different and unique MDNs and ESNs (904, 908, 914, 918, 924, 928, 934, 938).

Figure 10:
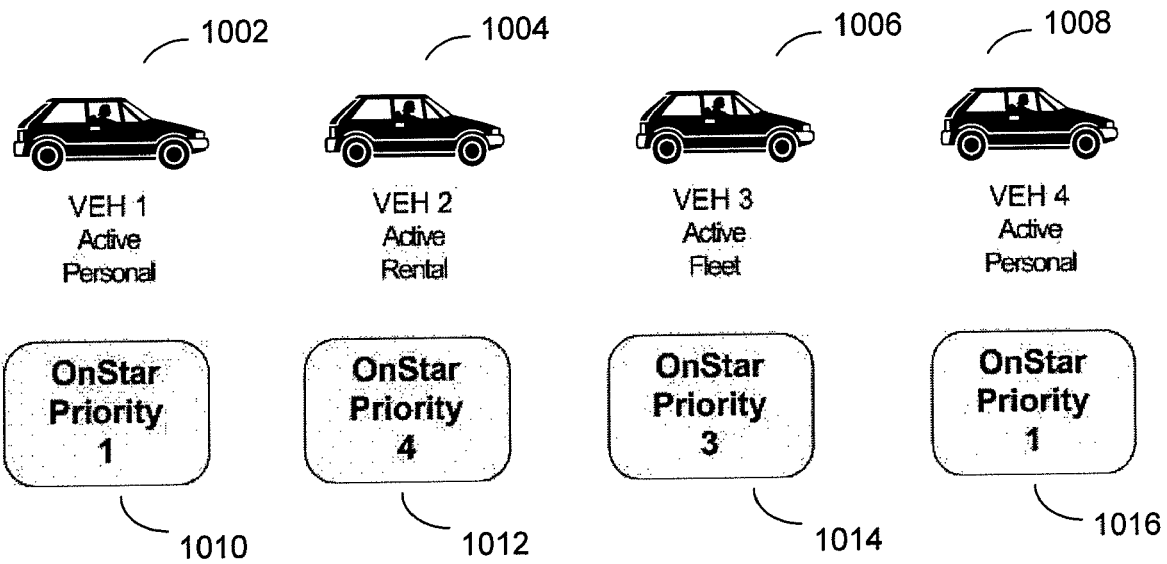

As shown in FIG. 10, the telematics service provider then isolates the impacted vehicles (1002-1008) by Account Status and Account Type to determine a priority of correction. Account Status may be Active or Inactive. Exemplary Account Types may include Personal, Business, Fleet, Rental, or Company Vehicle. An exemplary prioritization methodology is listed in Table 1.

TABLE 1

Exemplary Prioritization Methodology

| Account Type | Account Status | Priority |
| --- | --- | --- |
| Personal | Active | 1 |
| Business | Active | 2 |
| Fleet | Active | 3 |
| Rental | Active | 4 |
| Company Vehicle | Active | 5 |

Figure 11:
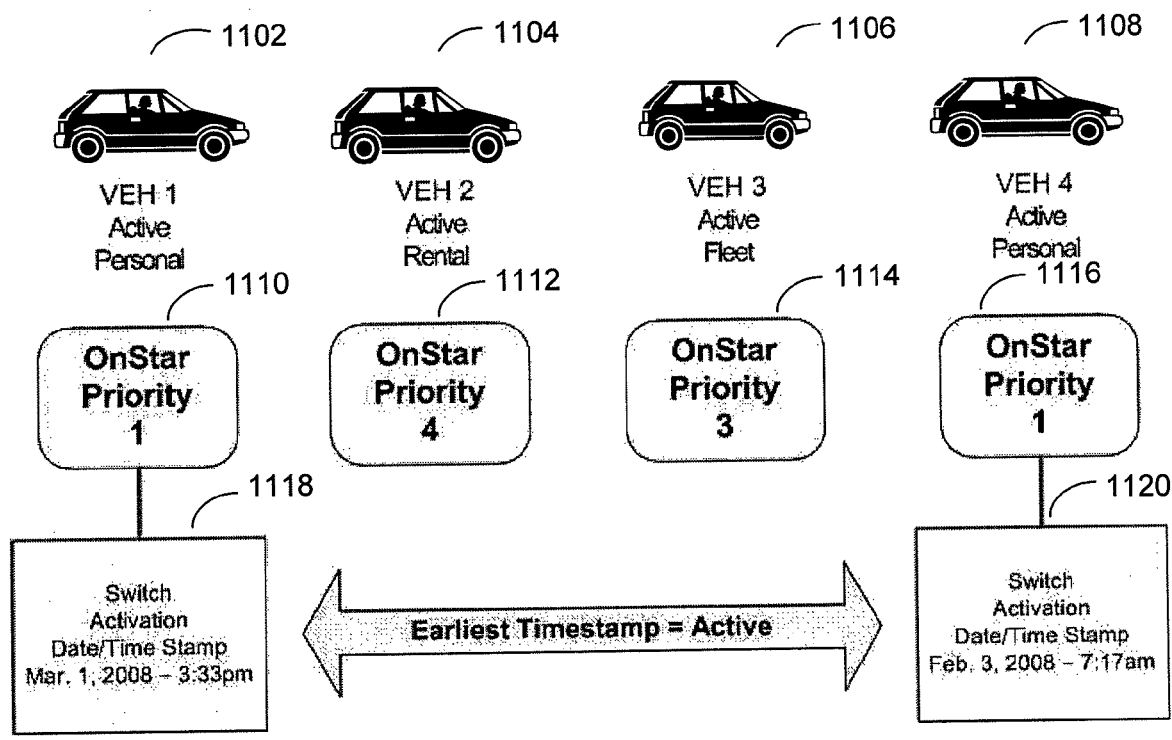

Using such a methodology, vehicle 1 and vehicle 4 each have a priority value equal to 1 (1010, 1016), vehicle 3 has a priority value equal to 3 (1014), and vehicle 2 has a priority value equal to 4 (1016). At a step shown in FIG. 11, when the telematics service provider's vehicles have the same priority values, the wireless service provider will activate the highest priority vehicle that has the earliest Switch Activation Date/Time Stamp. FIG. 11 shows both vehicle 1 (1102) and vehicle 4 (1108) have a priority value equal to 1 (1110, 1116). In cases where more than one vehicle has the same priority value, the vehicles are further prioritized based on the earliest Switch Activation Date/Time Stamp. Vehicle 1 has a Switch Activation Date/Time Stamp of Mar. 1, 2008—3:33 pm (1118) while vehicle 4 has a Switch Activation Date/Time Stamp of Feb. 3, 2008—7:17 am (1120). Thus, the wireless service provider activates vehicle 4.

Figure 12:
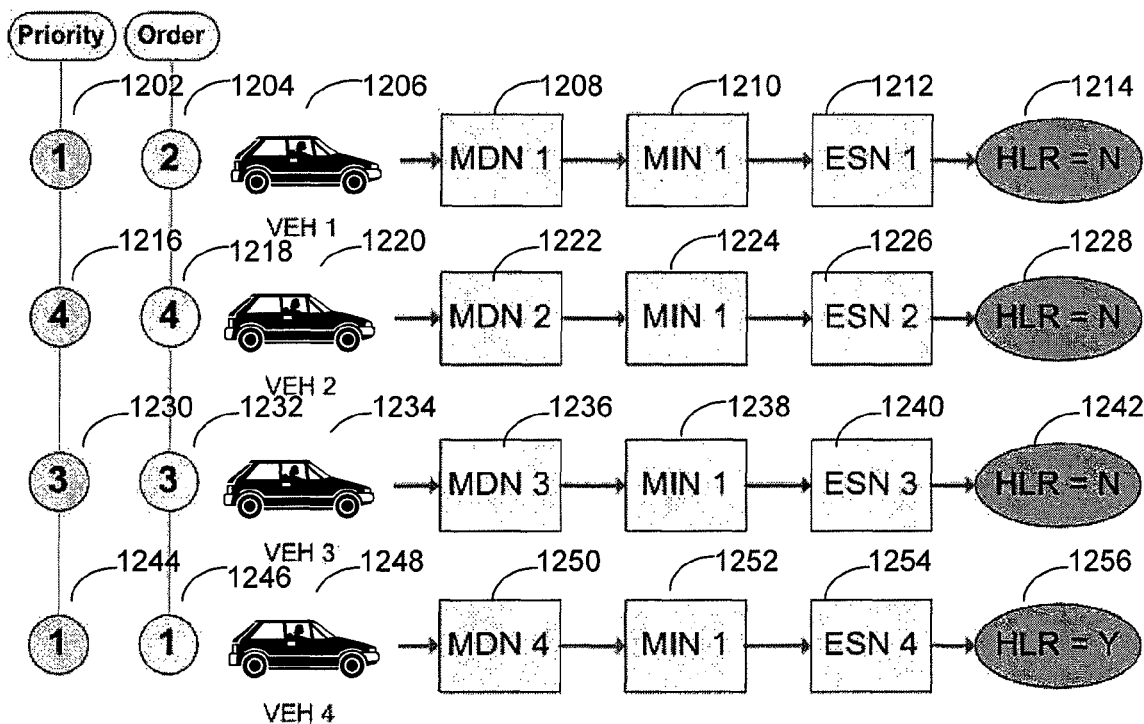
Figure 13:
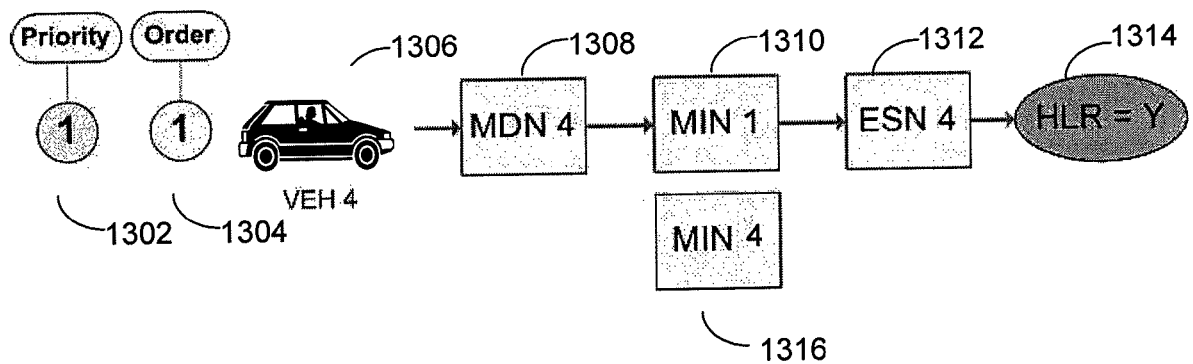
Figure 14:
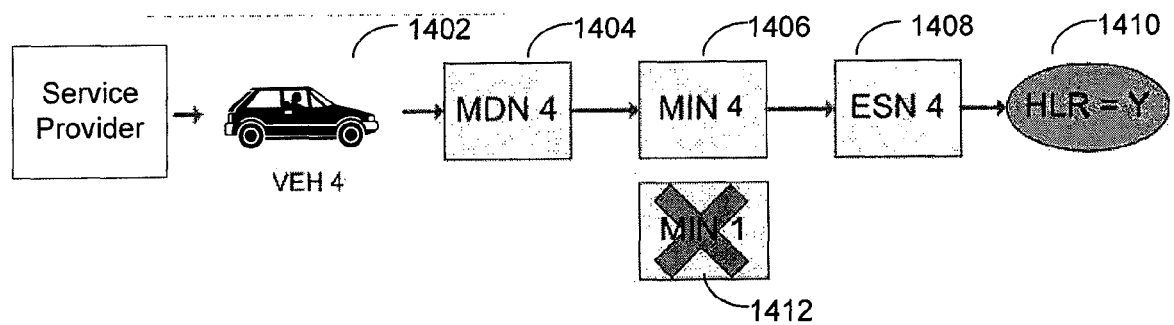
Figure 15:
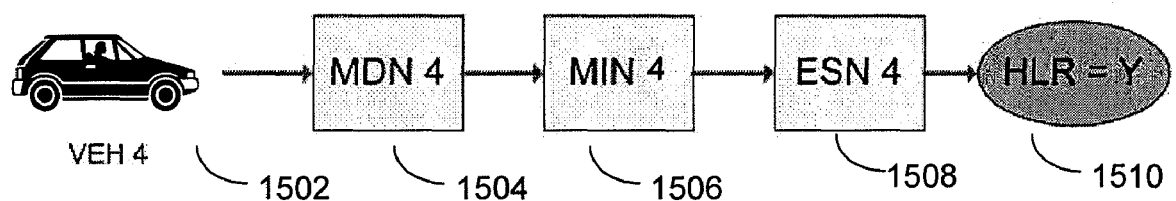
Figure 16:
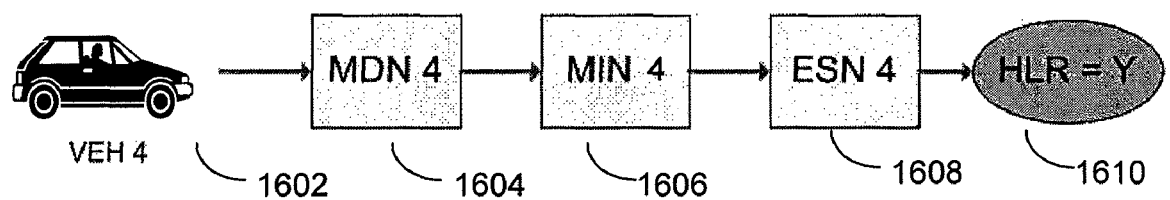

As shown in FIG. 12, the wireless service provider then assesses the activation order of the telematics unit of each vehicle based on the telematics service provider's prioritization methodology (1202, 1216, 1230, 1244). In the exemplary step shown in FIG. 12, the activation order (1204, 1218, 1232, 1246) is vehicle 4 (1248), vehicle 1 (1206), vehicle 3 (1220), then vehicle 2 (1218). The wireless service provider activates the appropriate vehicle for MIN correction accordingly. At a step shown in FIG. 13, the wireless service provider acquires a new MIN (MIN 4) (1316) for active vehicle 4 (1306) and provides information to the telematics service provider so that the telematics service provider may update the telematics unit in vehicle 4. At a step shown in FIG. 14, the telematics service provider calls the telematics unit in vehicle 4 (1402) and updates the triplicate entry to (MDN 4, MIN 4, ESN 4) (1404, 1406, 1408). At the step shown in FIG. 15, the telematics service provider notifies the wireless service provider of a successful MIN change. The wireless service provider activates new MIN (MIN 4) 1506 to vehicle 4 (1502) by storing the (MDN 4, MIN 4, ESN 4) triplicate entry (1504, 1506, 1508) into the HLR 1510. As shown in FIG. 16, the wireless service provider then activates the cellular telephone in the telematics unit installed in vehicle 4 (1602) using the triplicate entry (1604, 1606, 1608) with the new MIN (MIN 4) 1606.

Figure 17:
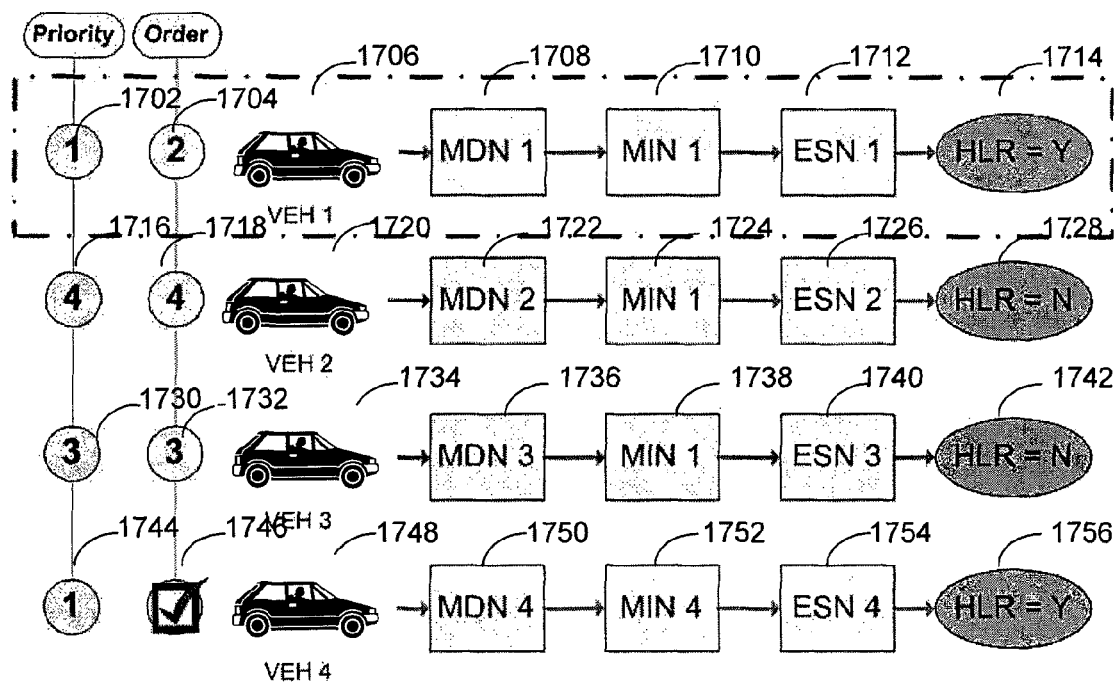
Figure 18:
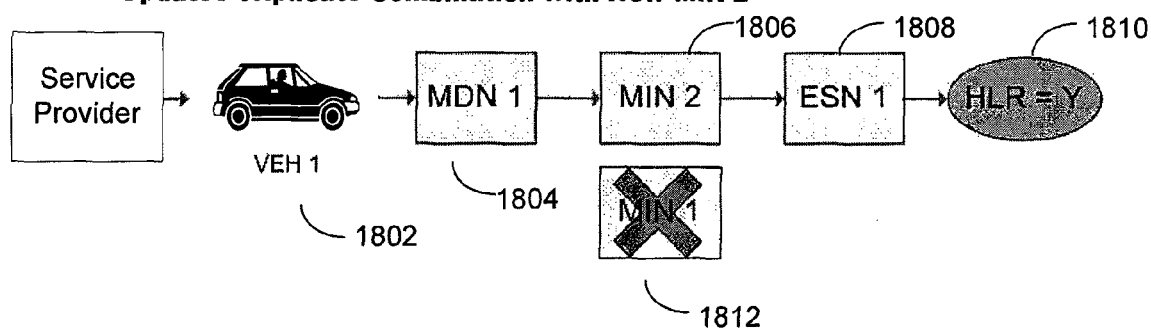
Figure 19:
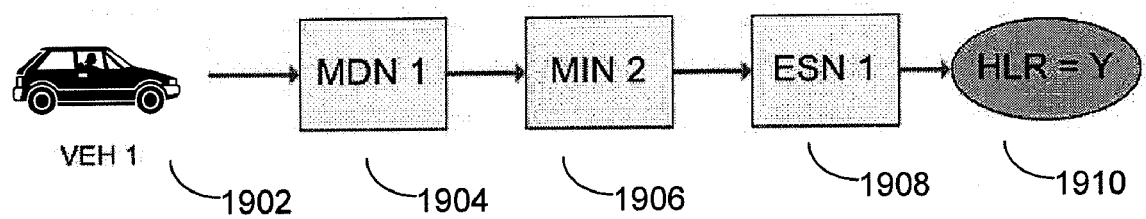

At the step shown in FIG. 17, the wireless service provider selects vehicle 1 (1706) based on the telematics service provider's prioritization methodology. The wireless service provider activates the cellular phone in the telematics unit installed in vehicle 1 (1706) with the new MIN for MIN correction. Next, as shown in FIG. 18, the telematics service provider calls vehicle 1 (1802) and updates the triplicate entry (MDN 1, MIN 2, ESN 1) (1804, 1806, 1808) stored in the cellular telephone in its telematics unit with a new MIN (MIN 2) 1806. At a step shown in FIG. 19, the wireless service provider activates vehicle 1 with the new MIN (MIN 2) 1906. This may include storing the (MDN 1, MIN 2, ESN 1) (1904, 1906, 1908) triplicate entry into the HLR 1910.

Figure 20:
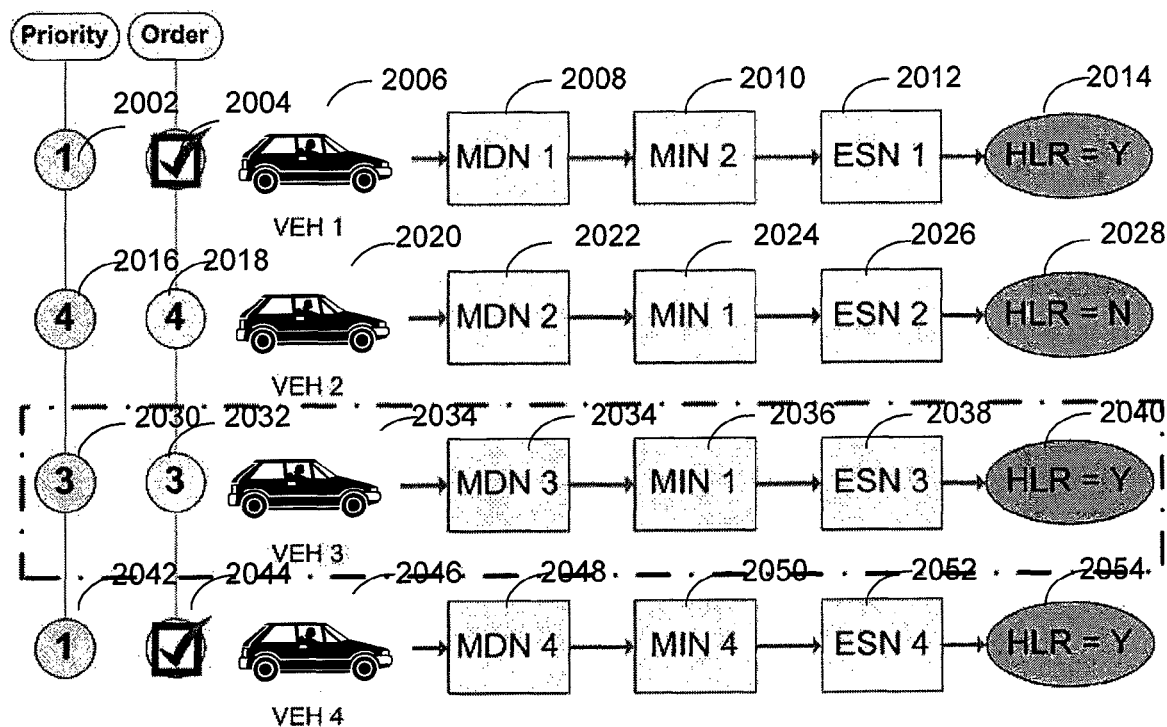
Figure 21:
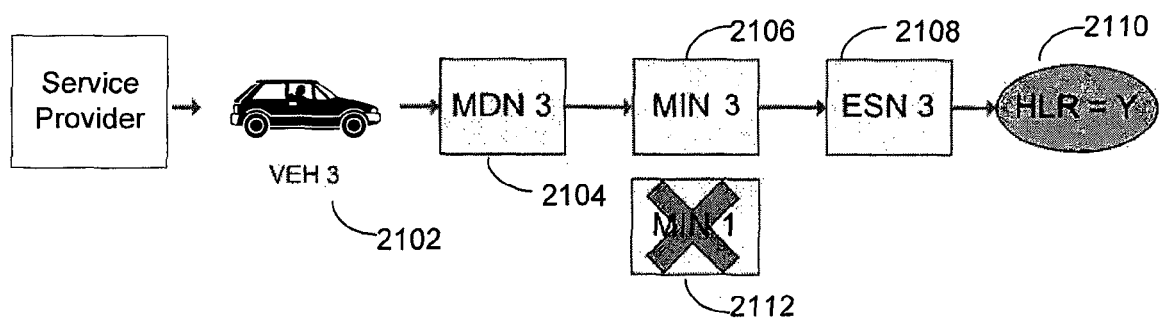
Figure 22:
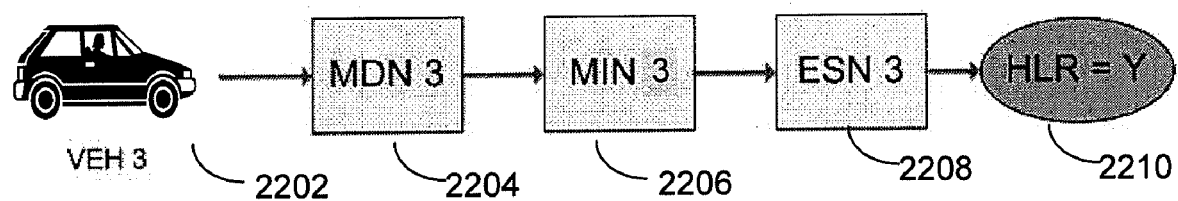

The wireless service provider then selects vehicle 3 (2034) based on the telematics service provider's prioritization methodology as shown in FIG. 20. The wireless service provider activates the cellular phone in the telematics unit installed in vehicle 3 (2034) with the new MIN for MIN correction. Next, as shown in FIG. 21, the telematics service provider calls vehicle 3 (2102) and updates the triplicate entry (MDN 3, MIN 3, ESN 3) (2104, 2106, 2108) stored in the cellular telephone in its telematics unit with a new MIN (MIN 3) (2106). At a subsequent step shown in FIG. 22, the wireless service provider activates vehicle 3 (2202) with the new MIN (MIN 3) (2206). This may include storing the (MDN 3, MIN 3, ESN 3) (2204, 2206, 2208) triplicate entry into the HLR 2210.

Figure 23:
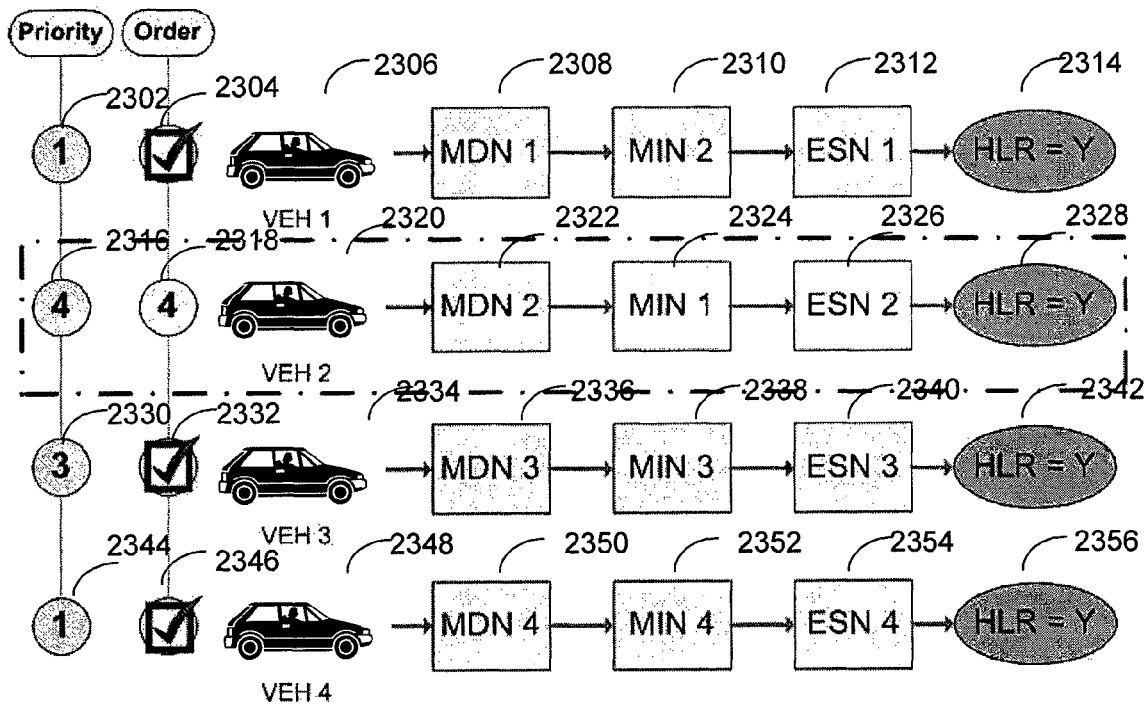
Figure 24:
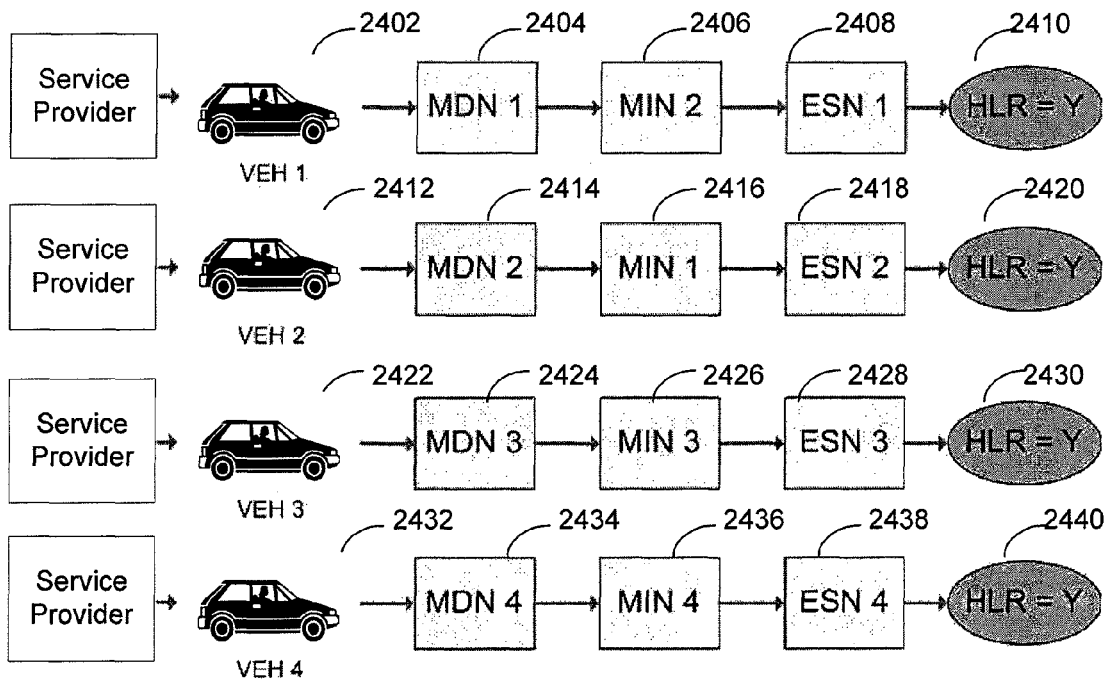
Figure 24:

Next, the wireless service provider selects a vehicle 2 (2320) based on the telematics service provider's prioritization methodology as shown in FIG. 23. The wireless service provider activates the cellular phone in the telematics unit installed in vehicle 2 (2320) with the new MIN for MIN correction. Finally, as illustrated in FIG. 24, the wireless service provider notifies the telematics service provider that it has successfully activated the telematics units for vehicles 1, 2, 3 and 4 (2402, 2412, 2422, 2432). The telematics service provider attempts to connect to the telematics units in all vehicles using the triplicate entries (2404-2408, 2414-2418, 2424-2428, 2434-2438) stored in the HLR (2410, 2420, 2430, 2440).

FIGS. 2-24 show exemplary steps according to certain the aspects and examples of the invention. Persons of ordinary skill in the art would understand that the exemplary steps may be performed in another order except where precluded by context, and that steps are numbered only for identification purposes.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred implementations of this invention are described herein, including the best mode known to the inventors for carrying out the invention. Variations of those preferred implementations may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for updating a mobile identification number in a cellular telephone in each of two or more telematics units, the method comprising:
   receiving an erroneous registry entry having a first mobile identification number that is not unique in that two or more cellular telephones associated with respective ones of the two or more telematics units share the first mobile identification number such that a first one of the telematics units cannot send and receive calls;
   sending a request to a wireless service provider to select a first cellular telephone in the first telematics unit of the two or more telematics units, the first cellular telephone being associated with a first triplicate entry stored in a home location registry for the first cellular telephone, the first triplicate entry including a first mobile directory number, an erroneous mobile identification number, and a first electronic serial number;
   sending a request to the wireless service provider to assign a second mobile identification number to the first cellular telephone;
   updating the first cellular telephone in the first telematics unit with the second mobile identification number; and
   notifying the wireless service provider of the update and requesting the wireless service provider to store the second mobile identification number in the first triplicate entry in the home location registry for the first cellular telephone.

2. The method according to claim 1, the method further comprising requesting the wireless service provider to store a second triplicate entry that includes the first mobile identification number in a second triplicate entry in the home location registry for a second cellular telephone in a second telematics unit.

3. The method according to claim 2, the method further comprising receiving a notification from the wireless service provider of activation of the first cellular phone in the first telematics unit and activation of the second cellular telephone in the second telematics unit.

4. The method according to claim 3, the method further comprising connecting to the first cellular phone in the first telematics unit and the second cellular telephone in the second telematics unit.

5. The method of claim 1 further comprising:
   prioritizing updating mobile identification of the two or more cellular telephones of the two or more telematics units based on account status and account type.

6. The method according to claim 5 further comprising prioritizing updating the first mobile identification number of each of the two or more cellular telephones of the two or more telematics units based on a switch activation time stamp.

7. The method according to claim 1 further comprising:
   sending a request to the wireless provider to select a second cellular telephone in a second telematics unit of the plurality of telematics units, the second cellular telephone having a second triplicate entry stored in a home location registry for the second cellular telephone, the second triplicate entry including a second mobile directory number, first mobile identification number, and a second electronic serial number;
   updating the second cellular phone in the second telematics unit with a second mobile identification number; and
   requesting the wireless service provider to store the second mobile identification number in the second triplicate entry in the home location registry for the second cellular telephone for the second telematics unit and to activate the second cellular telephone.

8. The method according to claim 7, the method further comprising:
   sending a request to the wireless provider to select a third cellular telephone in a third telematics unit of the plurality of telematics units having a third triplicate entry stored in a home location registry for the third cellular telephone, the third triplicate entry including a third mobile directory number, the first mobile identification number, and a third electronic serial number;
   updating the third cellular phone in the third telematics unit with a third mobile identification number; and
   requesting the wireless service provider to store the third mobile identification number in the third triplicate entry in the home location registry for the third cellular telephone in the third telematics unit and to activate the third cellular telephone.

9. The method according to claim 8, the method further comprising:
   sending a request to the wireless service provider to select a fourth cellular telephone in a fourth telematics unit of the plurality of telematics units having a fourth triplicate entry stored in a home location registry for the fourth cellular telephone, the fourth triplicate entry including a fourth mobile directory number, the first mobile identification number, and a fourth electronic serial number; and
   requesting the wireless service provider to store the fourth mobile identification number in the fourth triplicate entry in the home location registry for the fourth cellular telephone in the fourth telematics unit and to activate the fourth cellular telephone.

10. The method according to claim 9, the method further comprising receiving a notification from the wireless service provider of activation of the first cellular phone in the first telematics unit, activation of the second cellular telephone in the second telematics unit, activation of the third cellular telephone in the third telematics unit, and activation of the fourth cellular telephone in the fourth telematics unit.

11. The method according to claim 10, the method further comprising connecting to the first cellular phone in the first telematics unit, the second cellular telephone in the second telematics unit, the third cellular phone in the third telematics unit, and the fourth cellular phone in the fourth telematics unit.

12. The method according to claim 5, wherein the account status is selected from the group consisting of active and inactive.

13. The method according to claim 5, wherein the account type is selected from the group consisting of personal, business, fleet, rental, and company vehicle.

14. A nontransitory computer-readable medium comprising computer-executable instructions for:

receiving an erroneous registry entry having a first mobile identification number that is not unique in that two or more cellular telephones associated with respective ones of two or more telematics units share the first mobile identification number such that a first one of the telematics units cannot send and receive calls;

sending a request to a wireless provider to select a first cellular telephone in the first telematics unit of the two or more telematics units, the first cellular telephone being associated with a first triplicate entry stored in a home location registry for the first cellular telephone, the first triplicate entry including a first mobile directory number, an erroneous mobile identification number, and a first electronic serial number;

sending a request to the wireless service provider to assign a second mobile identification number to the first cellular telephone;

updating the first cellular phone in the first telematics unit with the second mobile identification number;

notifying the wireless service provider of the updated status of the first cellular phone; and requesting the wireless service provider to store the second mobile identification number in the first triplicate entry in the home location registry for the first cellular telephone.

15. The nontransitory computer-readable medium of claim 14 further comprising computer-executable instructions for:

updating mobile identification numbers in a plurality of cellular telephones associated with a respective plurality of telematics units, each of the plurality of telematics units having an account status and account type associated therewith; and prioritizing the update of the mobile identification number of each of the plurality of cellular telephones of the plurality of telematics units based on account status and account type.

16. The nontransitory computer-readable medium according to claim 15 further comprising computer-executable instructions for:

prioritizing the update of the first mobile identification number of each of the plurality of cellular telephones of the plurality of telematics units based on a switch activation time stamp.

17. The nontransitory computer-readable medium according to claim 15, wherein the account status is selected from the group consisting of active and inactive.

18. The nontransitory computer-readable medium according to claim 15, wherein active accounts receive priority over inactive accounts.

19. The nontransitory computer-readable medium according to claim 15, wherein the account type is selected from the group consisting of personal, business, fleet, rental, and company vehicle, and wherein personal accounts receive priority over accounts associated with other account types of the group.

* * * * *